July 7, 1959     R. C. VAN CAMP     2,893,685
VALVE HAVING RESILIENT WAFER-LIKE DISC CLOSURE
Filed July 3, 1957
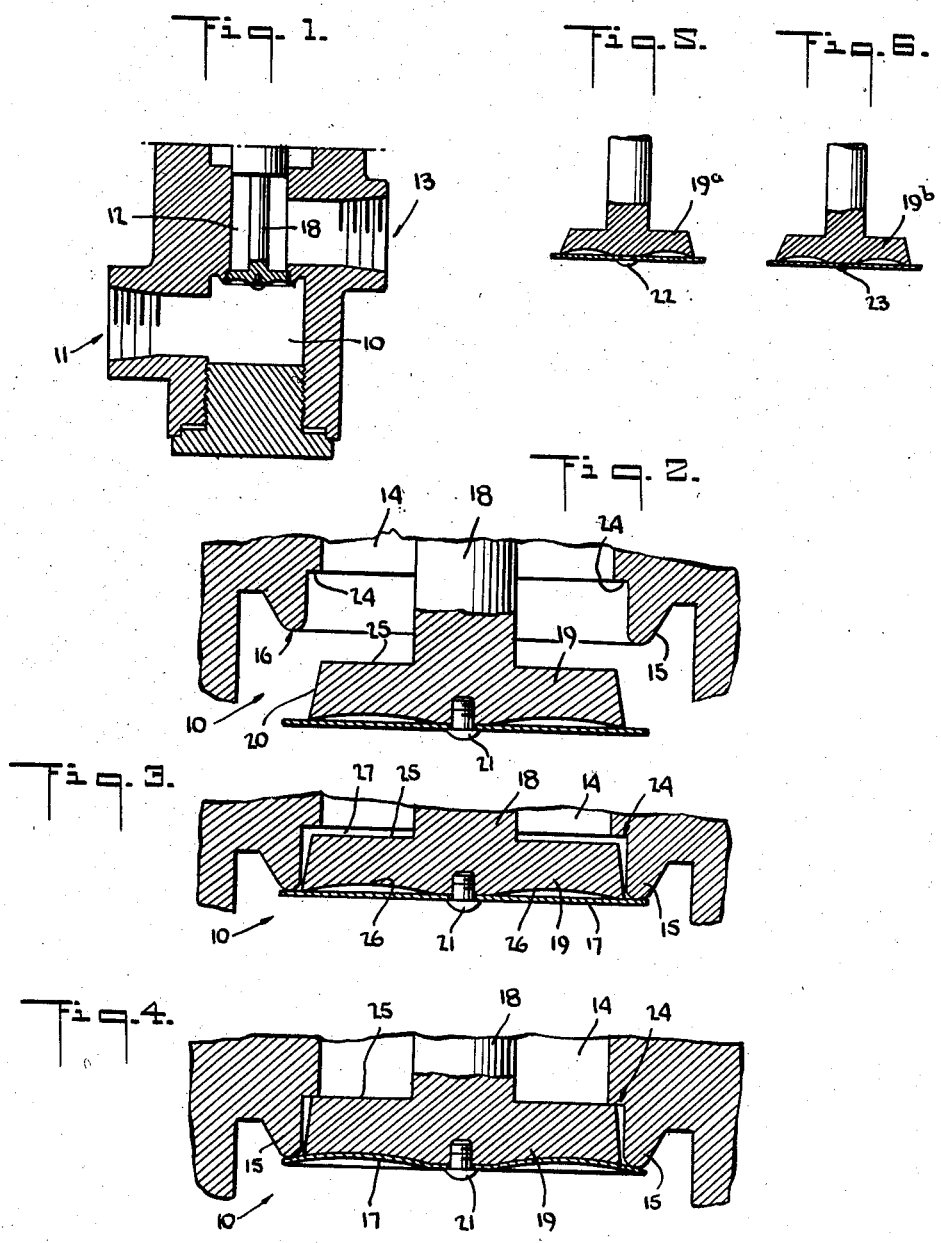
INVENTOR.
ROSCOE C. VAN CAMP
BY
ATTORNEY United States Patent Office 2,893,685
Patented July 7, 1959

2,893,685

VALVE HAVING RESILIENT WAFER-LIKE DISC CLOSURE

Roscoe C. Van Camp, Madison, N.J., assignor to Automatic Switch Co., Florham Park, N.J., a corporation of New York Application July 3, 1957, Serial No. 669,841

5 Claims. (Cl. 251—334)

This invention relates generally to valves, and has particular reference to poppet-type valves.

Conventional valve constructions involving metal-to-metal contact between a valve element and a valve seat do not always function properly if the valve parts are subjected to temperatures high enough to cause warpage. Such high temperatures may be encountered during manufacture of the valve (for example, where the valve body is formed of parts that are welded together into a permanently sealed unit); or the use of the valve may subject the valve parts to warping temperatures. Distortions produced by warping prevent tight closure of the valve, and this is of course a serious and sometimes fatal defect, especially when fluids at high pressures are being controlled. For example, in a water valve having a one inch port area, a warpage of as little as 0.0002 inch will leak approximately twelve gallons in an hour at a pressure of 3000 pounds per square inch. Aside from the loss of fluid, which is often far more valuable than water, warpage tends to become progressively worse because of the concentration of heat and fluid pressure at the leak area.

It is a general object of this invention to provide an improved valve structure which obviates these disadvantages. The invention is primarily intended for high-temperature high-pressure installations, but it is useful for a wide variety of purposes and is not necessarily restricted either as to the nature of the fluids handled or to the temperatures or pressures involved. It has proven to be particularly applicable to installations in which the valve body is required to be welded into a permanently closed unit, and is therefore subjected to unusually high temperatures during manufacture. It has also proven to be satisfactory under circumstances where conventional valve constructions are inadequate, for example, where the fluid to be controlled is at pressures of the order of two to three thousand pounds per square inch and temperatures up to 700° F. or higher. Neither the heat to which the valve parts are subjected during manufacture, nor the heat and pressures encountered during use, affect the ability of the improved valve to operate reliably and effectively, and in a leakproof manner, over long periods of time.

It is another object of the invention to provide a construction which is mechanically of relatively simple nature, hence economical and entirely practical from a manufacturing standpoint; and which will function satisfactorily and reliably even at ordinary temperatures and pressures.

The invention is predicated upon the employment as a port closing element, of a wafer-like disc of flexible resilient material which is so constructed and mounted that its deflectability allows it to adjust automatically to the dimensional deviations of the valve body or valve seat engendered by high temperatures and pressures. The disc is preferably but not necessarily composed of suitable metal, chosen to be adequately strong to withstand high temperatures and pressures, yet flexible and elastic to the desired degree. A particular feature of the invention resides in the manner of supporting the valve disc, and mounting it for movements toward and away from a valve seat, so that the deflections of the disc are always restrained to lie within its elastic limit, yet available and effective to a maximum degree for the desired purpose.

Several ways of achieving these objects and advantages, and such other objects and advantages as may hereinafter appear or be pointed out, are illustratively exemplified in the accompanying drawings, in which—

Fig. 1 is a cross-sectional view of a typical valve body provided with a valve seat and valve closure of the improved character, the valve being shown in its closed condition;

Figs. 2, 3, and 4 are enlarged fragmentary cross-sectional views showing the valve seat and the valve element in fully open, almost closed, and completely closed relationsips, respectively; and Figs. 5 and 6 are views illustratively showing the various ways in which the valve disc may be connected to the underlying valve support.

The valve body herein chosen for illustration has a high-pressure chamber 10 in communication with a fluid inlet 11, a low-pressure chamber 12 in communication with an outlet 13, and a port or passage 14 between the chambers 10 and 12. Formed at the high-pressure end of the passage 14 is a valve seat 15 presenting a rounded seating surface 16 toward the incoming fluid. It is to be understood that the passage 14 is of the usual circular cross-section, and that the valve seat 15, and the valve element cooperating therewith, are of corresponding circular shape.

Arranged in the high-pressure chamber 10, for co-operation with the valve seat 15, is a valve disc 17 composed of metal or equivalent flexible elastic material, and of wafer-like dimensions. The disc 17 is concentrically arranged with respect to the passage 14 and the valve seat 15, and is supported for reciprocatory movement so that its marginal region will seat and unseat itself with respect to the valve seat 15 in order to close and open the passage 14. These movements of the valve element 17 may be effected and guided in any usual manner, and have not been shown in detail. The valve stem 18, for example, may be actuated mechanically or by fluid means and may be supported, with or without the aid of biasing springs or the like, in any of various known ways.

One of the unique structural features of the present invention lies in the provision of a rigid supporting body 19 underlying the disc 17, preferably on the seat-engaging side of the disc. The disc support 19 is of reduced diameter with respect to the disc 17, and is concentric therewith. In the illustrated construction the rigid disc support 19 is provided at the end of the valve stem 18 and comprises a relatively thick body of metal of generally frusto-conical shape, the side wall 20 being slightly tapered, as shown. A means is provided for rigidly securing the disc 17 at its center to the disc support 19, and this securing means may take the form of a threaded stud 21, or a swaged head 22 (Fig. 5) on a stud or projection formed on the body 19a. Other equivalent securing means may be employed. In Fig. 6, for example, I have shown a welded connection 23 between the center of the disc and the underlying rigid support 19b.

The disc 17 is normally flat, lying in a single plane when unstressed and unflexed. By securing it to the underlying rigid support 19 only at the center thereof, the remainder of the disc is free to deflect under the stresses to which it is subjected when the valve is closed.

Before describing the operation, and the unusual manner in which the disc 17 performs its contemplated function, it is to be observed that an abutment or shoulder 24 is formed in the passage 14, facing the high-pressure chamber 10. The abutment 24 is so located that it will be encountered by the outer face 25 of the support 19 during the closing movement of the valve element, but only after the marginal part of the disc 17 has encountered the valve seat 15. Thus, it will be observed from Fig. 3 that the axial distance between the valve seat 15 and the shoulder 24 is slightly greater than the thickness of the disc support 19, as a result of which the marginal part of the disc 17 comes into contact with the valve seat 15 before the outer face 25 of the element 19 has encountered the abutment 24.

During the final part of the valve-closing movement, the disc 17 bends or deflects somewhat as indicated in Fig. 4. Under the combined stresses imposed by the contact of the disc margin with the rounded surface 16 of the valve seat 15, and the high pressure fluid bearing upon the face of the disc 17 after its flow through the passage 14 has been cut off, the body of the disc 17 bulges away from the high pressure chamber 10. To permit this bulging to occur, the intimate face 26 of the disc support 19 is toroidally concaved. This bulging of the disc 17 is a desirable distortion of the disc because it is spread over a wide radial extent, and as a result the radius of curvature of the disc at its seat-engaging periphery is considerably greater (i.e., the distortion is less severe) than would be the case if the disc support 19 were flat.

In accordance with the invention, the degree of concavity of the face 26, and the minute longitudinal distance (designated 27) between the face 25 of the support 19 and the abutment 24, are such that the deflection of the disc 17, as indicated in Fig. 4, is restricted to a range within the elastic limit of the disc. In this way, regardless of the amount of pressure difference between the high-pressure side of the valve and the low-pressure side, there is never any distortion of the disc 17 sufficient to distort it permanently and thus impair its further usefulness as a valve-closing instrument. At the same time, the major part of the area of the disc 17 remains available to deflect or bend so as to compensate automatically for any dimensional deviations in the annular valve seat 15. In this way, the valve is always reliably closed to a thoroughly leakproof extent. The rounding 16 of the valve seat contributes to this desirable result, since a firm tangential contacting relation between the valve seat and the margin of the disc 17 is always achieved.

It will thus be observed that a valve constructed in accordance with the features of this invention affords a reliable metal-to-metal shut-off of fluid flow, regardless of pressures or temperatures involved, and regardless of deviations that may have occurred or are likely to occur during the initial manufacture of the valve or during its continued use under the severe conditions for which it is designed. The valve structure is nevertheless of relatively simple mechanical nature, readily manufacture, relatively inexpensive, and capable of functioning equally well at more commonly encountered lower temperatures and pressures.

In general, it is to be understood that many of the details herein described and illustrated may be modified by those skilled in the art without necessarily departing from the spirit and scope of the invention as expressed in the appended claims.

I claim:

1. In a valve, a valve body having a high pressure chamber and a low pressure chamber and a passage between them, an annular valve seat formed at the high pressure end of said passage and facing the high pressure chamber, a valve disc in the high pressure chamber and comprising a wafer-like element of flexible elastic material, means for moving said disc back and forth so that its margin will seat and unseat itself with respect to said valve seat and thereby close and open said passage, a rigid disc support of reduced diameter on the low pressure side of said disc and concentrically underlying all but said margin of the disc, said rigid support being movable into said passage when the disc is moved to seating position, means rigidly securing said disc at its center to said support, the remainder of the disc being free to deflect when its margin encounters said valve seat, the face of the disc support nearest said disc being toroidally concaved to allow the disc to bulge in the direction away from the high pressure chamber as the disc margin encounters and is pressed against the valve seat, and a stop for limiting the movement of the disc support in the seating direction, the degree of said concavity and the location of said stop being such that the disc deflection is restricted to a range within the elastic limit of the disc.

2. The valve structure set forth in claim 1, in which said stop is on the wall of said passage and comprises an annular abutment facing the high pressure end of the passage and located to be encountered by the outer face of the disc support after the valve seat has been encountered by said disc margin.

3. The valve structure set forth in claim 1, in which said stop is on the wall of said passage and comprises an annular abutment facing the high pressure end of the passage and located in the path of the disc support, the axial distance between the valve seat and said abutment being slightly greater than the distance between the disc margin and the outer face of the disc support whereby the disc margin necessarily encounters the valve seat before the disc support encounters said abutment during the seating movement of the valve disc.

4. In a valve intended to afford reliable metal-to-metal shut-off of fluid flow, an annular metallic valve seat facing upstream, a wafer-like deflectable elastic metallic valve disc, means for supporting said disc for reciprocatory movement so that its marginal region will seat and unseat itself with respect to the valve seat, said means including a rigid disc support of reduced diameter on the downstream side concentrically underlying all but said marginal region of the disc, said disc support having a toroidal concavity on the face adjacent to said disc, said disc being rigidly secured at its center to said support, the remainder of the disc being free to deflect toward said concavity when said marginal region encounters said valve seat, the extent of such deflection being limited by said concave face, and a stop for limiting the movement of the disc support in the seating direction, the degree of said concavity and the location of said stop being such that the disc deflection is restricted to a range within the elastic limit of the disc.

5. In a valve, the structure defined in claim 4, in which said valve seat is convexly rounded and the peripheral region of said concavity is substantially tangent thereto when the valve disc is fully seated thereon.

References Cited in the file of this patent

UNITED STATES PATENTS 1,211,877  Quinn _____ Jan. 9, 1917

FOREIGN PATENTS 37,973  Germany _____ of 1887
2,681  Great Britain _____ of 1907